(12) United States Patent
Majid (10) Patent No.: US 10,388,247 B2
(45) Date of Patent: Aug. 20, 2019

(54) DYNAMIC DISPLAY DEVICE ADJUSTMENT FOR STREAMED VIDEO

(71) Applicant: BBY SOLUTIONS, INC., Richfield, MN (US)

(72) Inventor: Mahmood Majid, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 135 days.

(21) Appl. No.: 15/083,872

(22) Filed: Mar. 29, 2016

(65) Prior Publication Data

US 2017/0287433 A1   Oct. 5, 2017

(51) Int. Cl.

| | |
|---|---|
| *H04N 21/40* | (2011.01) |
| *G09G 5/00* | (2006.01) |
| *H04N 5/57* | (2006.01) |
| *H04N 21/431* | (2011.01) |
| *H04N 21/439* | (2011.01) |
| *H04N 21/4402* | (2011.01) |
| *H04N 21/6332* | (2011.01) |

(52) U.S. Cl.
CPC ............. *G09G 5/003* (2013.01); *H04N 5/57* (2013.01); *H04N 21/431* (2013.01); *H04N 21/4398* (2013.01); *H04N 21/4402* (2013.01); *H04N 21/6332* (2013.01); *G09G 2320/02* (2013.01); *G09G 2320/08* (2013.01); *G09G 2340/02* (2013.01); *G09G 2370/04* (2013.01); *G09G 2370/06* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 9,947,297 B2 * | 4/2018 | Tusch | G09G 5/363 |
| 2005/0099545 A1 | 5/2005 | Zhu | |
| 2008/0016532 A1 * | 1/2008 | Wang | H04N 5/4401 725/45 |
| 2009/0161017 A1 * | 6/2009 | Glen | H04N 5/775 348/624 |
| 2010/0271390 A1 * | 10/2010 | Tran | G06F 3/1454 345/619 |
| 2012/0008050 A1 | 1/2012 | Hirono | |

* cited by examiner

*Primary Examiner* — Cai Y Chen
(74) *Attorney, Agent, or Firm* — Schwegman Lundberg & Woessner, P.A.

(57) ABSTRACT

Embodiments of a system including a display device are described herein. For example, the system may receive streaming video data including information indicating a video quality identifier and apply a video parameter enhancement to a subsystem of the display device. In a further example, the system outputs video using the video parameter enhancement. In another example, the video parameter enhancement may he applied to alter an output characteristic of the display device.

22 Claims, 5 Drawing Sheets

DYNAMIC DISPLAY DEVICE ADJUSTMENT FOR STREAMED VIDEO

TECHNICAL FIELD

Embodiments pertain to electronic video processing techniques in a display device. Some embodiments relate to altering an output characteristic of a display device. Some embodiments further relate to outputting video on a display device using a video parameter enhancement.

BACKGROUND

Streaming video is often sent and received using different files sizes with varying bit rates and formats. The bit rates, formats, and file sizes depend upon available encodings, network bandwidth, and media player or device processing speeds. Some media players and devices start video playback using a lower bit-rate in order to optimize for speed of playback, reception bandwidth, network, and initial buffering during video playback. However, these techniques tend to degrade picture quality. Due to this initial buffering and low bit-rate, especially with larger video files such as streamed movies, video quality for the initial seconds or minutes of the start of playback of the streaming content may be displayed with poor picture quality.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may he included in, or substituted for, those of other embodiments. Embodiments set forth in the claims encompass all available equivalents of those claims.

Figure 1:
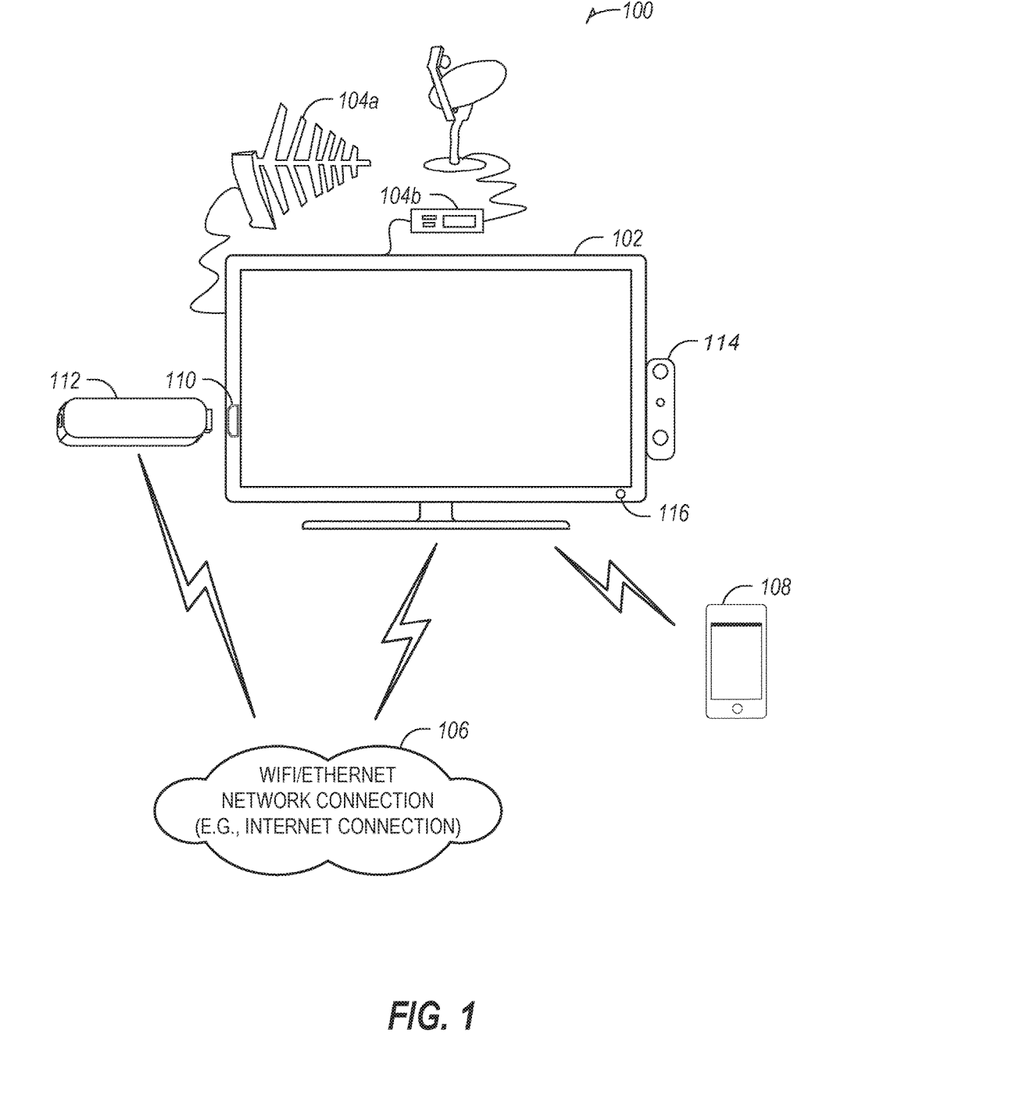
FIG. 1 illustrates an example display device configured to receive streaming video in connection with an example further described herein.

FIG. 1 illustrates an example system 100 including a display device 102 configured to receive streaming video in connection with an example further described herein. The display device 102 may be coupled with an antenna 104a or satellite receiver 104b. The display device 102 may be coupled with a mobile device 108 (e.g., smartphone), desktop/notebook personal computer (PC), tablet, or other computing device. The display device 102 may receive streaming video using a network connection 106, such as over a Wi-Fi or Ethernet connection to the internet. Streaming video (including video obtained from a broadcast) may be provided to the display device 102 from the antenna 104a/satellite receiver 104b, the mobile device 108, or a device connected via the network connection 106 or connected via an audiovisual input port 110 (e.g., a network-connected media player 112, gaming blue-ray/DVD player, or the like device that may be coupled to the display device via an HDMI/MHL port)).

In an example, the HDMI/MHL port may be used by the display device 102 to communicate with network-connected media player 112, gaming console, blue-ray/DVD player, and the like, using CEC commands. The CEC commands may communicate, from these devices to the display device 102, commands to change controllable subsystems of the display device 102, or to communicate other information (e metadata) that indicates video or audio characteristics of playback. For example, a CEC command received from a DVD player may be used to change a resolution of the display device 102 in response to determining an output resolution of DVD video content. in another example, the network-connected media player 112 may receive and output streaming video to the display device 102, and the media player 112 may use CEC commands to communicate metadata to the display device 102 that indicates video or audio characteristics to be used to change controllable subsystems (e.g., to improve picture or audio quality of the playback of the streaming video).

The streaming video may be received in various formats, such as a Motion Picture Experts Group media file (MPEG-2). Streaming video may be received for display on the display device in other formats, such as a Flash format streaming video file, (e.g., FLV, F4V, or SWF), a H.264 encoding (e.g., a mp4 or MPEG-4 format), AVI, WMV, High Efficiency Video Coding (e.g., HEVC, H.265, or MPEG-H Part 2), HTTP Live Streaming (HLS), or the like. Streaming audio may be received using the video file formats described above, or in lossy file formats, such as mp3, aac, wmv9, wma, ogg, wav files, or the like. in another example, audio may be received in a lossless file format, such as Apple Lossless, Free Lossless Audio Codec (FLAC), Audio Interchange File Format (AIFF), or the like.

Streaming video data may be communicated within the system 100 to be displayed on the display device 102. The streaming video data may he include streaming video and a video quality identifier, such as a bit rate, a bandwidth, or a resolution of the streaming video. The bit rate, bandwidth, or resolution may vary from a first corresponding frame to a next corresponding frame of the streaming video. The bit rate, bandwidth, or resolution may vary depending on available network resources or speeds or other video downloading attributes. A video quality identifier may change based on upstream considerations, such as load on a server or network sending the streaming video data. A video quality identifier may correspond to streaming video received over a network connection, and may not be affected by output characteristics of the display device 102.

Output characteristics of the display device 102 may include a sharpness value, a contrast value, an edge enhancement value, a skin tone correction value, a color gain value, a motion estimation and motion compensation value, a back light (e.g. on/off or an intensity value), a scalar performance value, a missing or incorrect color pixel on a frame correction value, a dynamically controlled Light Emitting Diode (LED) back light intensity value, a noise filter, or the like. The output characteristics of the display device 102 may operate on controllable subsystems of the display device 102. The output characteristics may be changed by the system 100 or the display device 102, in response to receiving the streaming video data including a video quality identifier. For example, a sharpness value may be increased if a received resolution is below a threshold resolution. In an example, the sharpness value may be adjusted for all or substantially all pixels of a display device or subsets of all the pixels, such as pixels that are active, edge pixels, pixels with high frequency changes (e.g., motion) for motion blurring, a noisy set of pixels, or the like. In another example, high spatial frequency content may be increased with respect to the low spatial frequency content.

The system 100 may be configured to dynamically adjust picture quality, audio quality, or other output characteristics of the display device 102. For example, the display device 102 may be a television (e.g., a Smart TV) that may control output characteristics of its display subsystems to accommodate the variable and varying bit rate playback of streaming video content.

The steaming video data may be transmitted to the system 100 or the display device 102 in a variety of file sizes. For example, file sizes may include small files, high definition (HD) files, 4K files, 4K×2k files, or the like.

The dynamic adjustment to output characteristics by applying a video parameter enhancement to a controllable subsystem of the display device 102 may be activated on received streaming video data. In another example, the dynamic adjustment may continuously monitor, and adjust to, incoming streaming video data. For example, the dynamic adjustment may include a real time dynamic adjustment. In another example, the dynamic adjustment may be active during playback of streamed content, when network congestion or lower bandwidth is identified. For example, when a video quality identifier falls below a threshold, the dynamic adjustment may be activated, such as when bit rate, resolution, bandwidth, or network resources fall below a threshold. In an example, the sub-threshold video quality identifier may cause a video player to request a lower bit rate for the streaming, which may affect quality of video or audio received at the display device 102. In response, the display device 102 or the system 100 may alter an output characteristic.

An output characteristic may be altered may during initial playback of streaming video. In another example, the output characteristic may be altered during a period with a higher network congestion or lower bandwidth. For example, during the middle of a movie, a video player may request a lower bit-stream if network resources are low, and the display device 102 or system 100 may alter an output characteristic in response.

The display device 102 may monitor an incoming streaming video bit rate, bandwidth, or other parameters, such as available maximum bandwidth, number of dropped video frames, amount of data currently being buffered, available video screen size, number of pixels that may be displayed per frame of video, or the like.

In an example, an output characteristic of the display device 102 may include a current screen size of the display device 102, such as a physical screen size, a maximum resolution of the display device 102, or a selected resolution for an application window or video player. This example may include using a processor to determine or calculate, for the particular screen size, that the initial bandwidth or bit rate are causing a lower picture quality than preferred or required. The output characteristic may be altered (including, in the case of the physical screen size, reducing the output area of pixels to effectively reduce the physical screen size), in response to applying a video parameter enhancement (e.g., reduce the number of pixels displayed) on a controllable subsystem (e.g., the pixel outputs) to improve video quality. In another example, the system 100 may dynamically determine that video or audio is substandard, and that modifying an output characteristic may improve video or audio quality. Using received streaming video or audio data, the system 100 may apply quality tuning parameters or enhancements to decoded video or audio from the streaming video or audio data. The enhancements may be maintained for a duration corresponding to the determined substandard quality, such as low bit rate or lower bit rate ranges. The range or threshold for "low" hit rate may be predetermined, such as based on the controllable subsystems available on the display device 102. The dynamic adjustments may be adapted continuously to monitor the streaming video quality. The dynamic adjustments may be used to compensate for changes in signal, content, or file quality during streaming.

In an example, a video quality identifier that may be monitored for quality to initiate a dynamic adjustment may include bandwidth, bitrate, resolution, or the like. The dynamic adjustment may include applying a video parameter enhancement to a controllable subsystem of the display device 102 to alter an output characteristic of the display device 102. The video parameter enhancement may include sharpness, contrast, edge enhancement, angle or range of skin tone correction, color gain, motion estimation and motion compensation (ME_MC), back light value=BL+X, turning DCR=OFF (e.g., adjusting dynamically controlled LED back light intensity), parameters for dynamic picture control blocks (e.g. Adaptive Contrast, auto color gain, Gamma values controlled via TV system on a chip (SoC) processor, etc.), scalar performance for up-conversion, such as based on past or future frames, inserting missing or incorrect pixels (e.g., color correcting) on a frame-by-frame basis, inserting a frame, or adjusting other parameters.

in an example, an audio quality identifier may be monitored for quality to initiate a dynamic adjustment, with such audio quality identifier being based on bandwidth, bitrate, resolution, or the like. The dynamic adjustment may include applying an audio parameter enhancement to a controllable subsystem of the display device 102, such as a speaker 114, to alter an output characteristic of the display device 102. The audio parameter enhancement may include audio volume corrections, as different audio files may produce different audio quality and sound levels, music equalization settings, Dialogue Clarity settings, frequency gains adjustments, or changes to other audio parameters. The controllable subsystems to implement these changes may be implemented as subsystems on the display device 102 or subsystems of the speaker 114, using software or hardware or a combination. For example, adjusting frequency gains may include changing a digital audio signal sent to the speaker 114 from the display device 102, or may include using a filter at the speaker 114.

The display device 102 may include a sensor 116, such as an electrical sensor or a light sensor to determine ambient light. In another example, the sensor 116 may include an audio feedback sensor (e.g., a microphone) to determine ambient noise levels. in yet another example, the sensor 116 may include an infrared sensor to receive adjustments to controllable subsystems remotely. In still another example, the sensor 116 may include a capture device (e.g., an infrared capture device, a camera, etc.). The capture device may be used to determine viewing angles of viewers of the display device 102 o optimize video or audio outputs.

Figure 2:
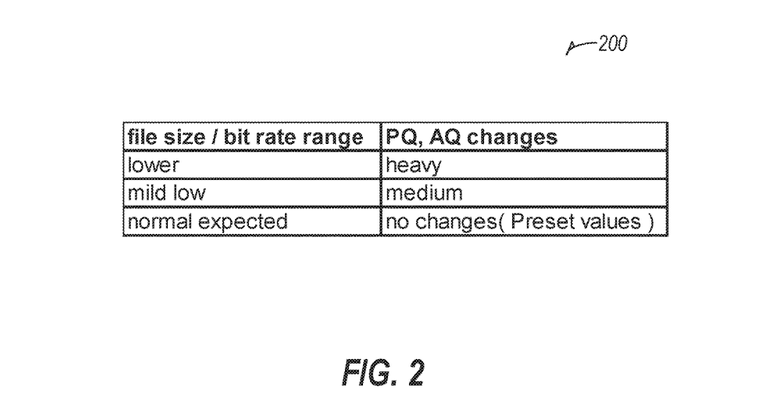
FIG. 2 illustrates an example database for selecting video parameter enhancements in connection with an example further described herein.

FIG. 2 illustrates an example database 200 for selecting video parameter enhancements in connection with an example further described herein. For example, the database 200 may include discrete quality value (e.g., video parameter enhancement) changes that may be applied to a controllable subsystem of a display for different video quality identifier values (e.g., bit rate ranges), to dynamically monitor and alter output characteristics of a display device. In the example shown in database 200, a file size or bit rate on the left column corresponds with a picture or audio quality change on the right column. The quality changes may he subjective, such that they may be queried by a range of display devices and applied to the individual device locally. For example, "heavy" and "medium" as shown in database 200 may correspond with a percentage change in sharpness. In another example, the quality changes may be absolute. In yet another example, the quality changes may be dependent on the specific display device used and may be percentages or absolute.

Figure 3:
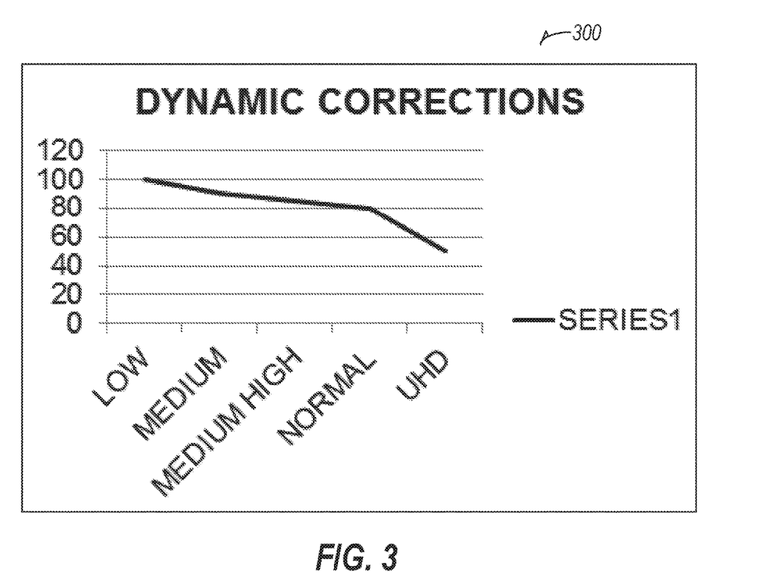
FIG. 3 illustrates a graph showing dynamic corrections to a video stream in connection with an example further described herein.

FIG. 3 illustrates a graph 300 showing dynamic corrections to a video stream in connection with an example further described herein. The dynamic corrections illustrated in graph 300 may be applied similarly to the deployment of the database 200 in FIG. 2, that is, graph 300 may represent absolute, relative, device. specific, device-neutral, predetermined, changing, or example values for both input video quality identifier and output video parameter enhancement. Graph 300 illustrates a continuously varying quality parameter value (x-axis) to alter an output characteristic during small time intervals (y-axis). The output allows for true dynamic corrections. For example, graph 300 may represent an output of contrast ratio correction as the video parameter enhancement versus bit rate quality over time. In an example, the series 1 may represent a sharpness value, arid the "UHD" value may represent a nominal signal, such as user or predefined settings. For example, the UHD value may include a user selected sharpness value, to be used as a minimum sharpness value. The dynamic correction may be applied to increase the sharpness when a received video includes a low quality indicator. The sharpness may be stepped down when the quality of the received video increases, until the sharpness value reaches the UHF) value (i.e., when the received video is at a high quality). The user or predefined settings may include a default sharpness, contrast, back light level, audio volume, or like settings, which may be modified based on the incoming video quality. The user or predefined settings may include a selection range that is narrower than a control range of control settings for controllable subsystems of a device. For example, a user may select a maximum or minimum. sharpness, which may represent a value that is still may be increased or decreased, respectively, automatically by a controllable subsystem, and the user maximum or minimum values may different from controllable or absolute maximum or minimum values.

Figure 4:
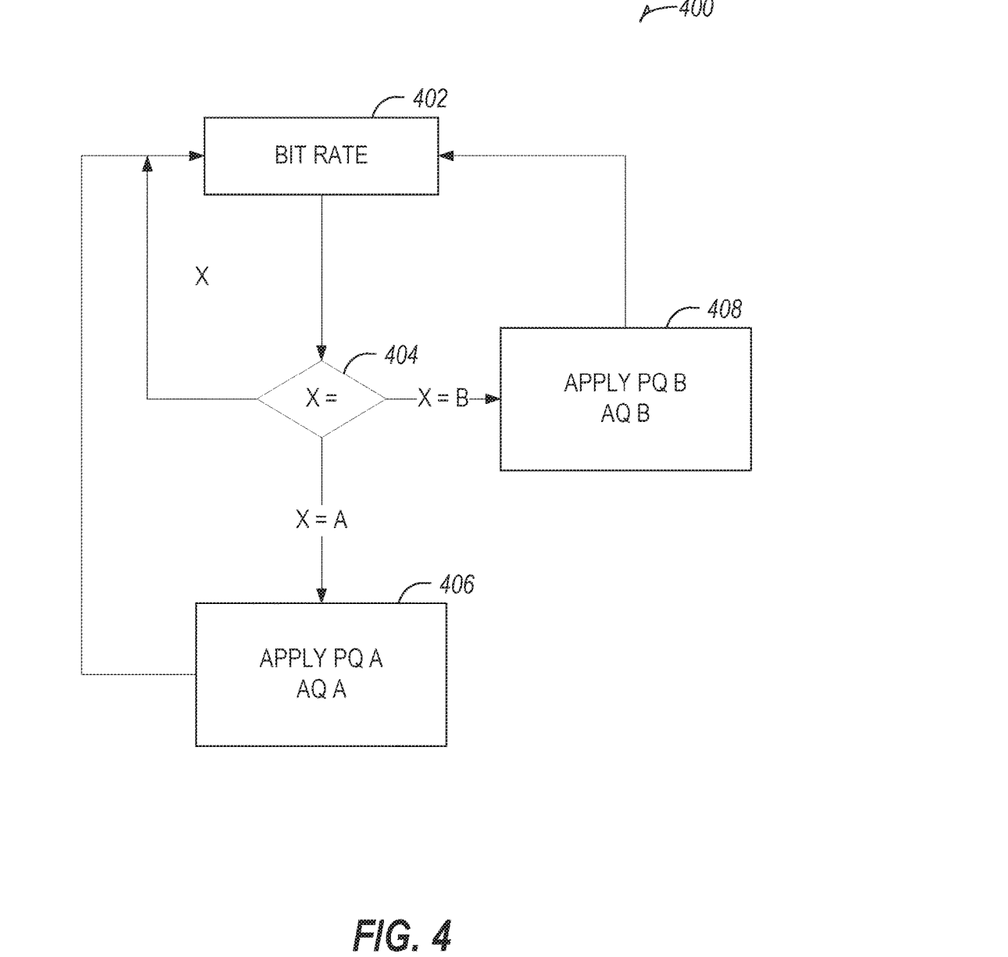
FIG. 4 illustrates a flowchart for determining a video parameter enhancement to apply based on a video quality identifier in connection with an example further described herein.

FIG. 4 illustrates a flowchart 400 for determining a video parameter enhancement to apply to a display device (e.g., to a controllable subsystem) based on a video quality identifier (e.g., from streaming video or audio) in connection with an example further described herein. The flowchart 400 includes an operation 402 to evaluate a video quality identifier of incoming streaming video or audio, such as a hit rate. Using the evaluated bit rate, the flowchart 400 includes a decision block 404 to determine whether the bit rate ("X") is within a normal range (e.g., "X"), in which case, the flow chart returns to operation 402 to continue to monitor the video quality identifier. If the bit rate is determined to be in a first range or below a first threshold (e.g., X=A), then proceed to operation 406. If the bit rate is determined to be in a second range or below a second threshold (e.g., X=B), then proceed to operation 408. At operation 406, the flowchart 400 includes changing a picture, video, or audio quality (e.g., applying video parameter enhancement A) to the display device to alter an output characteristic. Similarly, operation 408 includes applying video parameter enhancement B to the streaming video or audio. The video parameter enhancement may be, in an example, increasing contrast ratio, brightness, sharpness, etc., when the bit rate is too low to display good quality streaming video or audio. Both operations 406 and 408 may return to operation 402 to continue monitoring the bit rate.

The flowchart 400 may be used to monitor other video qualities using other video quality identifiers other than bit rate, such as content format, available bandwidth, resolution, or the like. The flowchart 400 may monitor these qualities sequentially and independently, concurrently and independently, dependently (e.g., combining two or more for quality minimums), or the like. For example, a minimum bit rate and a minimum bandwidth may be used together to determine whether to apply a video parameter enhancement. In the concurrent and independent case, bit rate and bandwidth may be separately monitored to determine whether either one falls below a threshold, and if either does, a video parameter enhancement may be applied. The video parameter enhancement may be the same regardless of whether the bit rate or the bandwidth falls below a threshold, or may be dependent on which quality falls below a threshold. In another example, the video parameter enhancement may be applied only when both bit rate and bandwidth fall below a threshold (e.g., the dependent case). The video parameter enhancement may be dependent on relative qualities of the bit rate and bandwidth when both fall below the thresholds (e.g., may apply multiple video parameter enhancements at relative intensity). In yet another example, the qualities may be monitored independently and sequentially. For example, the bit rate may be monitored without monitoring the bandwidth. Then, when the bit rate falls below a threshold, the bandwidth may monitored. The sequential monitoring may include contingencies (e.g., if the hit rate goes back up, the bandwidth is no longer monitored), or may trigger the independent monitoring (e.g., once the bit rate falls below the threshold, only monitor the bandwidth). In the sequential monitoring, after the bit rate falls below the threshold and the bandwidth is monitored, if the bandwidth falls below a threshold, a video parameter enhancement may be applied.

Figure 5:
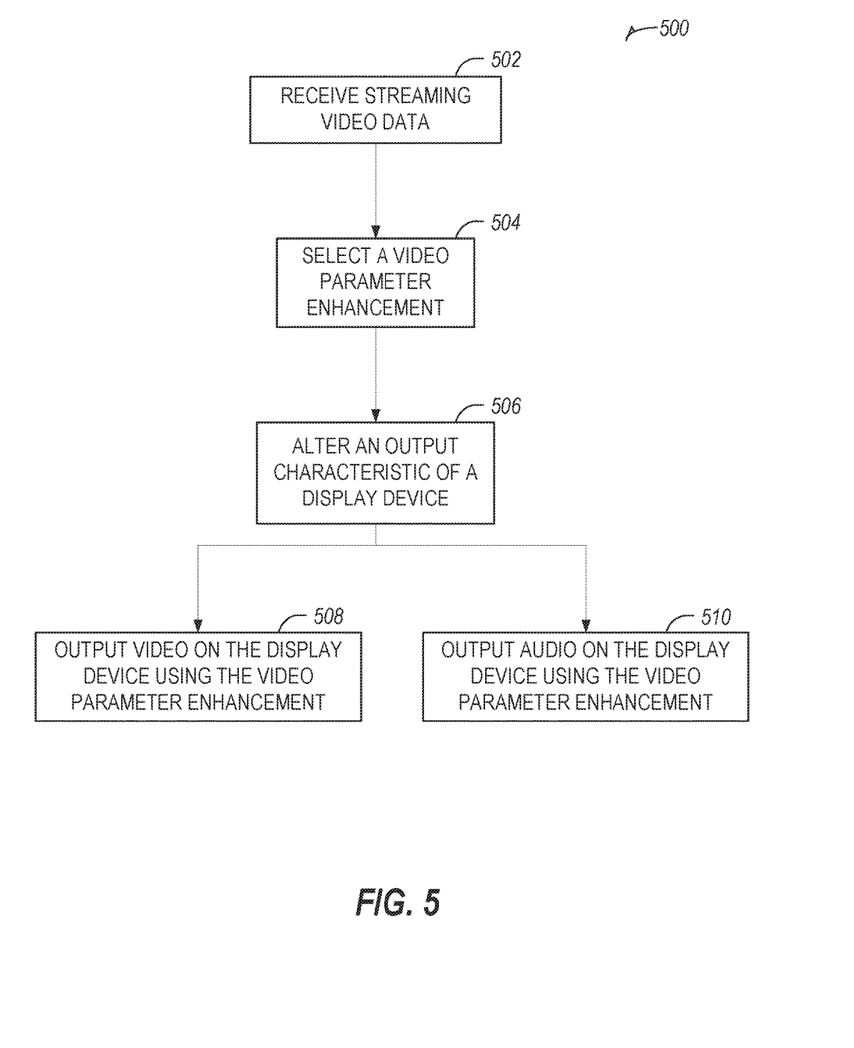
FIG. 5 illustrates a flowchart of a technique to output video on a display device using a video parameter enhancement in connection with an example further described herein.

FIG. 5 illustrates a flowchart of a technique 500 to output video on a display device using a video parameter enhancement in connection with an example further described herein. The technique 500 includes an operation 502 to receive streaming video data. The streaming video data may include streaming video, streaming audio, or information indicating a video quality identifier. In an example, a video quality identifier may be determined from the streaming video or streaming audio. In another example, a video quality identifier may be received separately from the streaming video or streaming audio. In an example, the video quality identifier includes a bit rate, a bandwidth, or a resolution, such as incoming values from the streaming video data.

The technique 500 includes an operation 504 to select a video parameter enhancement. The video parameter enhancement may be selected from a plurality of video parameter enhancements based on output characteristics of a display device. In an example, the display device may he a television, monitor, etc. The plurality of video parameter enhancements may be determined based on a location of the video quality identifier within a video quality range (e.g., in a range, below a threshold, within an error margin of a value, etc.). To select the video parameter enhancement, the technique 500 may include querying a database. The database may identify the video parameter enhancement by finding an enhancement corresponding to a range of values within the video quality range.

The technique 500 includes an operation 506 to alter an output characteristic of the display device. Altering the output characteristic may include altering at least one of the output characteristics used to select the video parameter enhancement. The video parameter enhancement may be applied to a controllable subsystem of the display device to alter the output characteristic. The output characteristics may include one or more settings for a resolution, sharpness, contrast, back light, or the like. To apply the video parameter enhancement, the technique 500 may change a sharpness value, change a contrast value, change an edge enhancement value, change a skin tone correction value, adjust a color gain value, change a motion estimation (e.g., changing the refresh value from 60 Hz to 120 Hz, or vice versa) and motion compensation value (e.g., to compensate for jitter blocking artifacts), adjust a back light, adjust a scalar performance value, insert a missing or incorrect color pixel on a frame, insert a frame, or adjust a dynamically controlled LED back light intensity. To apply the video parameter enhancement, the technique 500 may apply a noise filter. The noise filter may include a blocking noise filter or a mosquito noise filter to adjust picture quality of an output video. The noise filter may be used, for example, to reduce black level of a plurality of pixels in a display device. In another example, the noise filter may include a MPEG filter. Adjusting the back light may include local dimming or global dimming. Global dimming includes dimming all or substantially all pixels or active pixels. Local dimming includes dimming a portion of all of the pixels, such as dimming pixels of a certain color, location on a display screen, current intensity, or the like.

To apply the video parameter enhancement, the technique 500 may include changing parameters for a dynamic picture control block. Changing parameters for a dynamic picture control block may include changing an adaptive contrast or an auto color gain. In another example, the video parameter enhancement may include an audio enhancement, such as an audio volume correction, a dialogue clarity adjustment, or a music adjustment.

The technique 500 includes an operation 508 to output video on the display device using the video parameter enhancement. For example, to output video may include to output video on the display device, the output video corresponding to streaming video from the streaming video data. The output video may be displayed on the display device using the video parameter enhancement, such as displaying the streaming video at an increased sharpness, contrast, color gain, etc., or otherwise applying an enhancement to a controllable subsystem.

The technique 500 includes an operation 510 to output audio on the display device using the video parameter enhancement. For example, audio may be output on a speaker of the display device, the output audio corresponding to streaming audio from the streaming video data. The output audio may be generated on a speaker using the video parameter enhancement, such as generating the audio after applying a filter, increasing or decreasing volume of an output at a speaker, adjusting frequency gains, etc., or otherwise applying an enhancement to a controllable subsystem.

In an example, the technique 500 and other techniques described in the present disclosure may be used with combinations of pre-programmed user picture and audio settings (e.g., display "modes"). For example, a display device may include a number of display modes optimized for output of certain media content such as "Cinema", "Game", or "PC" modes. The video and audio adjustment techniques discussed herein may be implemented as part of one or more of these modes (or to adjust certain video and audio settings based on the type of mode). Additionally, the techniques discussed herein may be implemented as a separate display mode, such as a "Dynamic Streaming Mode", which may he activated or deactivated by a user (or, which may be automatically detected and implemented by the display device).

Figure 6:
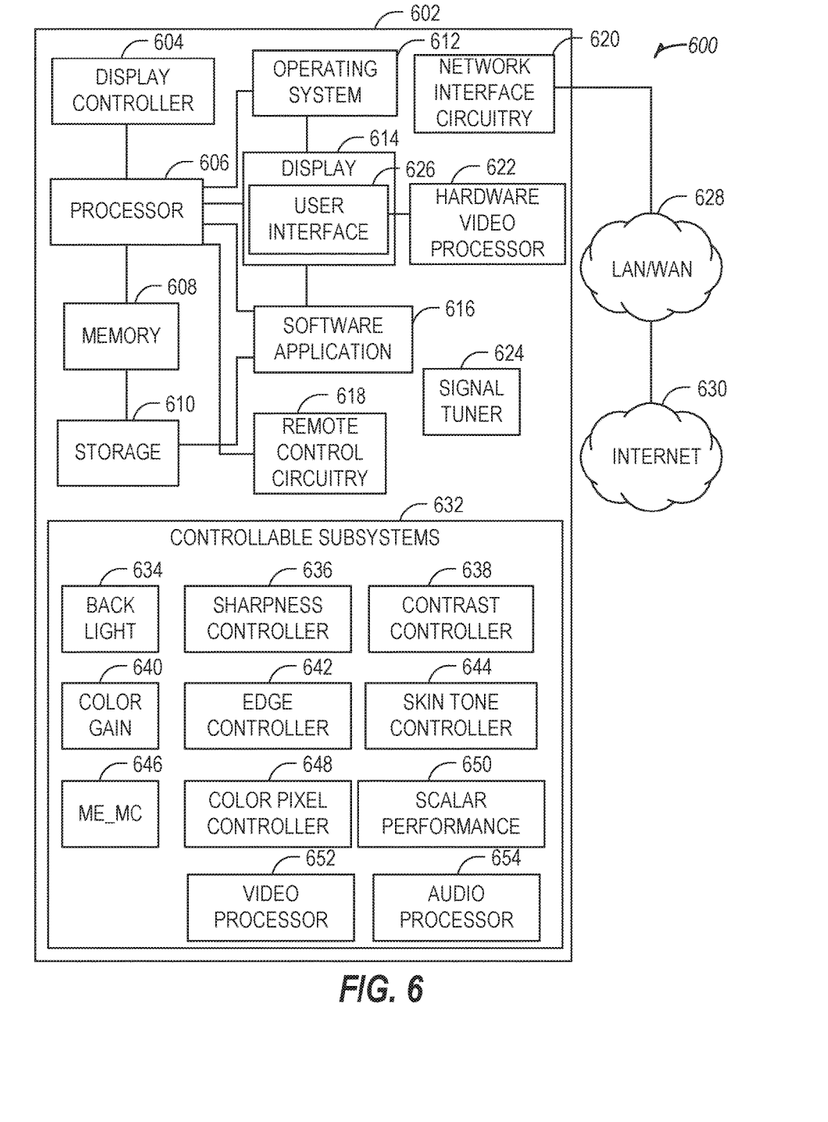
FIG. 6 illustrates a configuration of an electronic display device in connection with an example further described herein.

FIG. 6 provides an illustration of a block diagram 600 for an example architecture for operation with a display device 602, configured for implementing the example techniques described herein. In some examples, the display device 602 may include a display 614 such as a liquid crystal display (LCD), light-emitting diode (LED) display, organic light-emitting diode (OLED) display, cathode ray tube display, plasma display panel, or digital light processing (DLP) display, to directly provide an audiovisual output. The display 614 may be used to output a user interface 626. In some examples, the display device 602 may include functionality to directly receive user input with use of the display 614, such as with use of a touch screen input mechanism, or the display device 602 may receive user input in connection with other input processing components such as a video camera and video processing system configured to perform gesture-based detection and movement.

As shown, the display device 602 is coupled to one or more of audiovisual content sources, accessed through an analog processing component such as a signal tuner 624, a digital video processing component, or a digital audio processing component. The display device 602 may also receive content using a network interface circuitry 620, to establish a connection to receive content (e.g., streaming video data, streaming video, streaming audio, etc.) from the internet 630 via a local area network (LAN) or wide area network (WAN) connection 628. The signal tuner 624 may also optionally receive content using the network interface circuitry 620, to establish a connection to receive content from the internet 630 via the LAN or WAN connection 628. The network interface circuitry 620 may include or may connect to a LAN connector such as an Ethernet connector. The signal tuner 624 may be activated in response to receiving a user indication, an initialization, or an indication from the software application(s) 616, the operating system 612, the remote control circuitry 618, the network interface circuitry 620, a hardware video or audio processor 622, the processor 606, or the user interface 626 on the display 614. The signal tuner 624 may be used to decode a signal corresponding to a channel, scan a RE signal for a channel, or the like. The hardware video or audio processor 622 may be used to implement a codec to decode a signal similar to how the signal tuner 624 may decode a signal. The hardware video or audio processor 622 may be activated in response to receiving a user indication and the hardware video or audio processor 622 may attempt to decode or may decode a signal corresponding to a video using a codec. The hardware video or audio processor 622 may be configured to implement a codec or multiple codecs in series or parallel. The hardware video or audio processor 622 implementing a codec may be deactivated without deactivating the hardware video or audio processor 622 for other codecs or for other uses of the hardware video or audio processor 622.

The display device 602 is further configured to receive user input arid interaction with a remote or other user input control via infrared (IR), radio frequency (RF), Wi-Fi, or similar wireless communication using the remote control circuitry 618 and provide control of device operations through use of the processor 606. In an example, the remote control circuitry 618 may communicate with a remote control device, such as a controller or a mobile device (e.g., a mobile phone). The remote control device may include a transceiver for transmitting or receiving signals, such as IR, RF, Bluetooth, or Wi-Fi commands. The remote control device may also include a processor and buttons, a user interface, a display device, or the like for receiving commands from a user.

The operations of the display device 602 may be implemented. through use of a display controller 604, processor 606, memory 608, and storage component 610. The processor 606 may be operably coupled to the display controller 604, the memory 608, and the storage component 610, to facilitate operations of an operating system 612, user interface 626 on display 614, and one or more software application(s) 616. For example, instructions for execution of the user interface 626 and the software application(s) 616 may be provided in the storage component 610, loaded into the memory 608, and executed by the processor 606.

The operating system 612 may provide various functions and features to facilitate operation of the user interface 626 and the various software application(s) 616, including the interface and applications to implement the input selection mechanisms and on-screen display configurations described herein. The operating system 612, user interface 626, and software application(s) 616 may be configured for upgrading through either a local connection and commands (e.g., a universal serial bus (USB) port) or a remote connection and commands (e.g., an internet service) to obtain and deploy upgraded software.

The display device 602 includes controllable subsystems 632, such as a back light 634, a sharpness controller 636, a contrast controller 638, a color gain subsystem 640, an edge controller 642, a skin tone controller 644, a ME_MC 646, a color pixel controller 648, or a scalar performance subsystem 650. The various controllable subsystems 632 may be implemented separately or with overlapping circuitry. The various controllable subsystems 632 may include further components, for example, the back light 634 may include a bulb or light array (e.g., an LED array), control circuitry, user interaction circuitry, an analog to digital converter, a digital to analog converter, etc. The controllable subsystems 632 may connect with other components of the display device 602, although not shown in block diagram 600. For example, the processor 606 may be used to implement changes to the controllable subsystems 632, which may affect output characteristics of the display device 602, such as those controlled by the display controller 604 or the operating system 612. The memory 608 and storage 610 may be used to save a database of video quality identifiers or video parameter enhancements. In an example, the remote control circuitry 618 may be used to override actions taken by the controllable subsystem 632 to automatically change output characteristics. In another example, the automatically changing output characteristics may override actions taken by the remote control circuitry 618. The controllable subsystems 632 may be controlled using hardware interrupts, software interrupts, user inputs, or via the software application(s) 616, the operating system 612, or the processor 606.

The display device 202 may include a video processor 652. and an audio processor 654. The video processor 652, the audio processor 654, or the processor 606 may be used to implement audio or video control techniques. The video processor 652 may be used to control controllable subsystems related to video output and the audio processor 654 may be used to control controllable subsystems related to audio output. The video processor 652 may be used to determine bit rate, bandwidth, or resolution of incoming video. Similarly, the audio processor 654 may be used to determine bit rate, bandwidth, or resolution of audio related aspects of incoming streaming data. In an example, aspects of the display device 602 (e.g., multiple subsystems and processors) may be implemented within a system on a chip (SoC), system in package (SiP), or like component circuitry.

Embodiments of the techniques and configurations may be implemented within a variety of systems and display devices, including IS televisions, monitors, projectors, and other video display screens, in addition to display devices without a screen or other direct video output. Other devices that provide a line-out or stream audiovisual signals may be used in connection with the user interface described herein. As used herein, audio visual content refers to content including both audio and visual characteristics, as well as content providing exclusively audio characteristics or exclusively visual characteristics.

Embodiments may he implemented in connection with wired and wireless networks, across a variety of digital and mediums. Although some of the previously described techniques and configurations were provided with reference to implementations of consumer electronic devices with wired or physically coupled digital signal connections, these techniques and configurations may also be applicable to display of content from wireless digital sources from a variety of local area wireless multimedia networks and network content accesses using WLANs, WWANs, and wireless communication standards. Further, the previously described techniques and configurations are not limited to input sources provided from a direct analog or digital signal, but may be applied used with any number of multimedia streaming applications and protocols to provide display content over an input link.

Embodiments may be implemented in one or a combination of hardware, firmware, and software. Embodiments may also be implemented as instructions stored on a non-transitory machine-readable storage device or medium, which may be read and executed by at least one processor to perform the operations described herein. A machine-readable storage device or medium may include any non-transitory mechanism for storing information in a form readable by a machine (e.g., a computer or other processor-driven display device). For example, a machine-readable storage device or medium may include read-only memory (ROM), random-access memory (RAM), magnetic disk storage media, optical storage media, flash-memory devices, and other storage devices and media. in some embodiments, display devices such as televisions, A/V receivers, set-top boxes, and media players may include one or more processors and may be configured with instructions stored on such machine-readable storage devices or mediums.

VARIOUS NOTES & EXAMPLES

Each of these non-limiting examples may stand on its own, or may be combined in various permutations or combinations with one or more of the other examples.

Example 1 is a method performed by circuitry of a display device, the method comprising: receiving streaming video data including information indicating a video quality identifier; determining a plurality of video parameter enhancements based on a location of the video quality identifier within a video quality range; selecting a video parameter enhancement from the plurality of video parameter enhancements based on output characteristics of the display device; applying the video parameter enhancement to a controllable subsystem of the display device to alter at least one of the output characteristics of the display device; and outputting video on the display device using the video parameter enhancement.

In Example 2, the subject matter of Example 1 optionally includes wherein the display device is a television and wherein the controllable subsystem is a controllable component of a video processor or an audio processor of the television.

In Example 3, the subject matter of any one or more of Examples 1-2 optionally include wherein the output characteristics of the display device include at least one of a resolution, a sharpness, a contrast, or a back light setting.

In Example 4, the subject matter of any one or more of Examples 1-3 optionally include wherein the video parameter enhancement is identified in a database corresponding to a range of values within the video quality range.

In Example 5, the subject matter of any one or more of Examples 1-4 optionally include wherein the video quality identifier includes an incoming bit rate, an incoming bandwidth, or an incoming resolution.

In Example 6, the subject matter of any one or more of Examples 1-5 optionally include wherein applying the video parameter enhancement includes at least one of: changing a sharpness value; changing a contrast value; changing an edge enhancement value; changing a skin tone correction value; adjusting a color gain value; changing a motion estimation and motion compensation value; adjusting a scalar performance value; inserting a missing or incorrect color pixel on a frame; inserting a frame; adjusting a back light; or adjusting a dynamically controlled Light Emitting Diode back light intensity.

In Example 7, the subject matter of any one or more of Examples 1-6 optionally include wherein applying the video parameter enhancement includes changing parameters for dynamic picture control blocks.

In Example 8, the subject matter of Example 7 optionally includes wherein changing parameters for dynamic picture control blocks includes changing an adaptive contrast or an auto color gain.

In Example 9, the subject matter of any one or more of Examples 1-8 optionally include wherein the video parameter enhancement includes an audio enhancement.

In Example 10, the subject matter of Example 9 optionally includes wherein the audio enhancement includes at least one of an audio volume correction, a dialogue clarity adjustment, and a music adjustment.

Example 11 is a system comprising circuitry of a display device, the circuitry to: receive streaming video data including information indicating a video quality identifier; determine a plurality of video parameter enhancements based on a location of the video quality identifier within a video quality range; select a video parameter enhancement from the plurality of video parameter enhancements based on output characteristics of the display device; apply the video parameter enhancement to a controllable subsystem of the display device to alter at least one of the output characteristics of the display device; and output video on the display device using the video parameter enhancement.

In Example 12, the subject matter of Example 11 optionally includes wherein the display device is a television and wherein the controllable subsystem is a controllable component of a video processor or an audio processor of the television.

In Example 13, the subject matter of any one or more of Examples 11-12 optionally include wherein the output characteristics of the display device include at least one of a resolution, a sharpness, a contrast, and a back light setting.

In Example 14, the subject matter of any one or more of Examples 11-13 optionally include wherein the video parameter enhancement is identified in a database corresponding to a range of values within the video quality range.

In Example 15, the subject matter of any one or more of Examples 11-14 optionally include wherein the video quality identifier includes an incoming bit rate, an incoming bandwidth, or an incoming resolution.

In Example 16, the subject matter of any one or more of Examples 11-15 optionally include wherein applying the video parameter enhancement includes at least one of: changing a sharpness value; changing a contrast value; changing an edge enhancement value; changing a skin tone correction value; adjusting a color gain value; changing a motion estimation and motion compensation value; adjusting a scalar performance value; inserting a missing or incorrect color pixel on a frame; inserting a frame; adjusting a back light; or adjusting a dynamically controlled Light Emitting Diode back light intensity.

Example 17 is a non-transitory machine-readable medium including instructions which, when executed by circuitry of a display device, cause the display device to perform operations including: receiving streaming video data including information indicating a video quality identifier; determining a plurality of video parameter enhancements based on a location of the video quality identifier within a video quality range; selecting a video parameter enhancement from the plurality of video parameter enhancements based on output characteristics of the display device; applying the video parameter enhancement to a controllable subsystem of the display device to alter at least one of the output characteristics of the display device; and outputting video on the display device using the video parameter enhancement.

In Example 18, the subject matter of Example 17 optionally includes wherein the output characteristics of the display device include at least one of a resolution, a sharpness, a contrast, and a hack light setting.

In Example 19, the subject matter of any one or more of Examples 17-18 optionally include wherein the video quality identifier includes an incoming bit rate, an incoming bandwidth, or an incoming resolution.

In Example 20, the subject matter of any one or more of Examples 17-19 optionally include wherein applying the video parameter enhancement includes at least one of: changing a sharpness value; changing a contrast value; changing an edge enhancement value; changing a skin tone correction value; adjusting a color gain value; changing a motion estimation and motion compensation value; adjusting a scalar performance value; inserting a missing or incorrect color pixel on a frame; inserting a frame; adjusting a back light; or adjusting a dynamically controlled Light. Emitting Diode back light intensity.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method performed by circuitry of a display device, the method comprising:
   receiving variable bit-rate streaming video data, the streaming video data including information indicating a video quality identifier for a first frame of the video data and a second video quality identifier for a second frame of the video data;
   determining a plurality of video parameter enhancements based on a location of the video quality identifier within a video quality range;
   determining a second plurality of video parameter enhancements based on a location of the second video quality identifier within the video quality range;
   selecting, for the first frame, a video parameter enhancement from the plurality of video parameter enhancements based on physical output characteristics of the display device, wherein the video parameter enhancement is selected in part based on a bit-rate of the first frame;
   selecting, for the second frame, a second video parameter enhancement from the second plurality of video parameter enhancements based on the physical output characteristics of the display device, wherein the video parameter enhancement is selected in part based on a second bit-rate of the second frame;
   applying, for a first duration of the first frame, the video parameter enhancement to a controllable subsystem of the display device to alter at least one of the physical output characteristics of the display device when displaying the first frame, wherein the at least one of the physical output characteristics enhances physical display of the first frame using a first adjustment implemented at least in part by a back light of the display device, and wherein the first adjustment causes a first change to an intensity level of the back light;
   applying, for a second duration for the second frame, the second video parameter enhancement to the controllable subsystem of the display device to alter the at least one of the physical output characteristics of the display device when displaying the second frame, wherein the at least one of the physical output characteristics enhances physical display of the second frame using a second adjustment implemented at least in part by the back light of the display device, and wherein the second adjustment causes a second change to the intensity level of the back light; and
   outputting video on the display device using the video parameter enhancement for the first frame, during the first duration of the first frame, and the second video parameter enhancement for the second frame, during the second duration of the second frame.

2. The method of claim 1, wherein the display device is a television and wherein the controllable subsystem is a controllable component of a video processor or an audio processor of the television.

3. The method of claim 1, wherein the physical output characteristics of the display device include at least one of a resolution, a sharpness, a contrast, or a back light setting.

4. The method of claim 1, wherein the video parameter enhancement is identified in a database corresponding to a range of values within the video quality range.

5. The method of claim 1, wherein the video quality identifier includes an incoming bit rate, an incoming bandwidth, or an incoming resolution.

6. The method of claim 1, wherein applying the video parameter enhancement includes at least one of:
   changing a sharpness value;
   changing a contrast value;
   changing an edge enhancement value;
   changing a skin tone correction value;
   adjusting a color gain value;
   changing a motion estimation and motion compensation value;
   adjusting a scalar performance value;
   inserting a missing or incorrect color pixel on a frame;
   inserting a frame;
   adjusting the back light; or
   adjusting a dynamically controlled Light Emitting Diode to adjust the intensity level of the back light.

7. The method of claim 1, wherein applying the video parameter enhancement includes changing parameters for dynamic picture control blocks.

8. The method of claim 7, wherein changing parameters for dynamic picture control blocks includes changing an adaptive contrast or an auto color gain.

9. The method of claim 1, wherein the video parameter enhancement includes an audio enhancement.

10. The method of claim 9, wherein the audio enhancement includes at least one of an audio volume correction, a dialogue clarity adjustment, and a music adjustment.

11. A system comprising circuitry of a display device, the circuitry to:
    receive variable bit-rate streaming video data, the streaming video data including information indicating a video quality identifier for a first frame of the video data and a second video quality identifier for a second frame of the video data;
    determine a plurality of video parameter enhancements based on a location of the video quality identifier within a video quality range;
    determine a second plurality of video parameter enhancements based on a location of the second video quality identifier within the video quality range;
    select, for the first frame, a video parameter enhancement from the plurality of video parameter enhancements based on display device settings of the display device, wherein the display device settings define physical display output characteristics of the display device, wherein the video parameter enhancement is selected in part based on a bit-rate of the first frame;
    select, for the second frame, a second video parameter enhancement from the second plurality of video parameter enhancements based on the display device settings of the display device, wherein the video parameter enhancement is selected in part based on a second bit-rate of the second frame;
    apply, for a first duration of the first frame, the video parameter enhancement to a controllable subsystem of the display device to alter at least one display device setting of the display device settings of the display device when displaying the first frame, wherein the at least one altered display device setting modifies physical display of the first frame using a first adjustment implemented at least in part by a back light of the display device, and wherein the first adjustment causes a first change to an intensity level of the back light;

apply, for a second duration for the second frame, the second video parameter enhancement to the controllable subsystem of the display device to alter the at least one display device setting of the display device settings of the display device when displaying the second frame, wherein the at least one altered display device setting modifies physical display of the second frame using a second adjustment implemented at least in part by the back light of the display device, and wherein the second adjustment causes a second change to the intensity level of the back light; and output video on the display device using the video parameter enhancement for the first frame, during the first duration of the first frame, and the second video parameter enhancement for the second frame, during the second duration of the second frame.

12. The system of claim 11, wherein the display device is a television and wherein the controllable subsystem is a controllable component of a video processor or an audio processor of the television.

13. The system of claim 11, wherein the display device settings of the display device include at least one of a resolution, a sharpness, a contrast, and a back light setting.

14. The system of claim 11, wherein the video parameter enhancement is identified in a database corresponding to a range of values within the video quality range.

15. The system of claim 11, wherein the video quality identifier includes an incoming bit rate, an incoming bandwidth, or an incoming resolution.

16. The system of claim 11, wherein applying the video parameter enhancement includes at least one of:
changing a sharpness value;
changing a contrast value;
changing an edge enhancement value;
changing a skin tone correction value;
adjusting a color gain value;
changing a motion estimation and motion compensation value;
adjusting a scalar performance value;
inserting a missing or incorrect color pixel on a frame;
inserting a frame;
adjusting the back light; or
adjusting a dynamically controlled Light Emitting Diode to adjust the intensity level of the backlight.

17. A non-transitory machine-readable medium including instructions which, when executed by circuitry of a display device, cause the display device to perform operations including:
receiving variable bit-rate streaming video data, the streaming video data including information indicating a video quality identifier for a first frame of the video data and a second video quality identifier for a second frame of the video data;
determining a plurality of video parameter enhancements based on a location of the video quality identifier within a video quality range;
determining a second plurality of video parameter enhancements based on a location of the second video quality identifier within the video quality range;

selecting, for the first frame, a video parameter enhancement from the plurality of video parameter enhancements based on physical output characteristics of the display device, wherein the video parameter enhancement is selected in part based on a bit-rate of the first frame;

selecting, for the second frame, a second video parameter enhancement from the second plurality of video parameter enhancements based on the physical output characteristics of the display device, wherein the video parameter enhancement is selected in part based on a second bit-rate of the second frame;

applying, for a first duration of the first frame, the video parameter enhancement to a controllable subsystem of the display device to alter at least one of the physical output characteristics of the display device when displaying the first frame, wherein the at least one of the physical output characteristics enhances physical display of the first frame using a first adjustment implemented at least in part by a back light of the display device, and wherein the first adjustment causes a change to an intensity level of the back light;

applying, for a second duration for the second frame, the second video parameter enhancement to the controllable subsystem of the display device to alter the at least one of the physical output characteristics of the display device when displaying the second frame, wherein the at least one of the physical output characteristics enhances physical display of the second frame using a second adjustment implemented at least in part by the back light of the display device, and wherein the second adjustment causes a second change to the intensity level of the back light; and outputting video on the display device using the video parameter enhancement for the first frame, during the first duration of the first frame, and the second video parameter enhancement for the second frame, during the second duration of the second frame.

18. The machine-readable medium of claim 17, wherein the physical output characteristics of the display device include at least one of a resolution, a sharpness, a contrast, and a back light setting.

19. The machine-readable medium of claim 17, wherein the video quality identifier includes an incoming bit rate, an incoming bandwidth, or an incoming resolution.

20. The machine-readable medium of claim 17, wherein applying the video parameter enhancement includes at least one of:
changing a sharpness value;
changing a contrast value;
changing an edge enhancement value;
changing a skin tone correction value;
adjusting a color gain value;
changing a motion estimation and motion compensation value;
adjusting a scalar performance value;
inserting a missing or incorrect color pixel on a frame;
inserting a frame;
adjusting the back light; or adjusting a dynamically controlled Light Emitting Diode to adjust the intensity level of the back light.

21. The method of claim 1, wherein the first frame is received within a first bit rate stream and the second frame is received within a second bit rate stream.

22. The method of claim 1, wherein the first frame is a high-definition video frame and the second frame has a resolution smaller than that of the high-definition video frame.

* * * * *